United States Patent [19]

Daniel

[11] 4,236,158

[45] Nov. 25, 1980

[54] STEEPEST DESCENT CONTROLLER FOR AN ADAPTIVE ANTENNA ARRAY

[75] Inventor: Sam M. Daniel, Tempe, Ariz.

[73] Assignee: Motorola, Inc., Schamburg, Ill.

[21] Appl. No.: 22,663

[22] Filed: Mar. 22, 1979

[51] Int. Cl.[3] .......... H04B 7/00

[52] U.S. Cl. .......... 343/100 LE

[58] Field of Search .......... 343/100 LE, 100 CL

[56] References Cited

U.S. PATENT DOCUMENTS 4,097,866 6/1978 Frost et al. .......... 343/100 LE 4,129,873 12/1978 Kennedy .......... 343/100 LE

*Primary Examiner*—Theodore M. Blum

*Attorney, Agent, or Firm*—Eugene A. Parsons

[57] ABSTRACT

An adaptive antenna array including a main antenna and an auxiliary antenna with a steepest descent controller for deriving the optimal feedback gain to guarantee stable and rapid convergence of the weights comprising the weight vector w(t) to form a null in the direction of interference while having minimal effect on the main beam.

12 Claims, 4 Drawing Figures

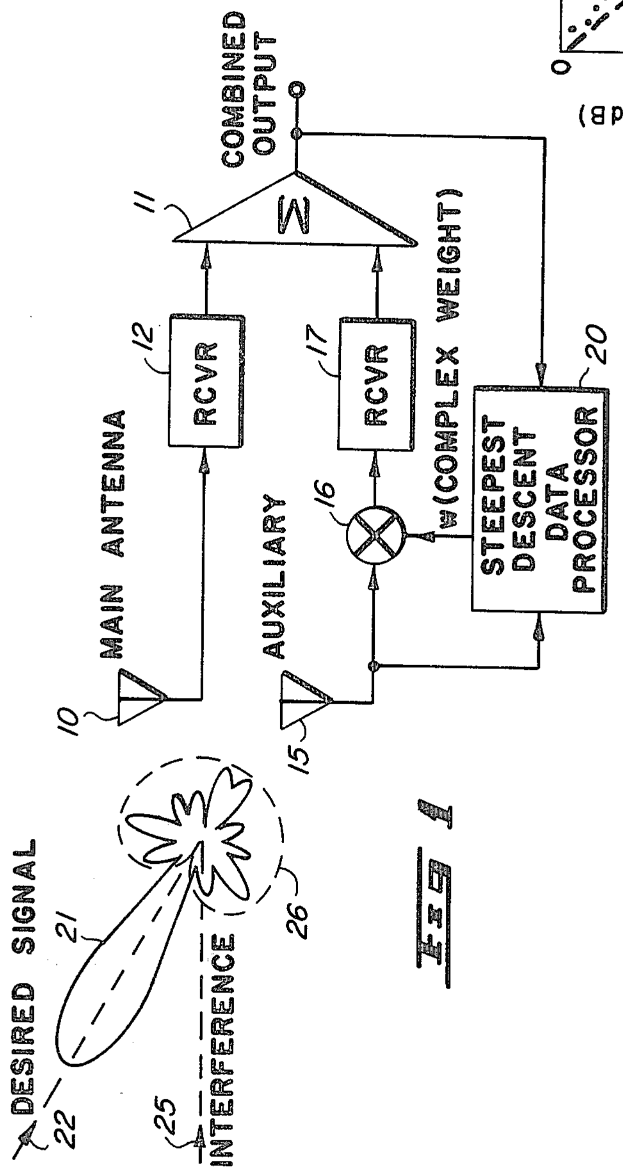
FIG 1
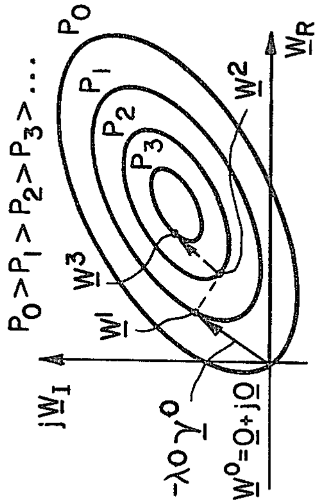
FIG 2
FIG 3
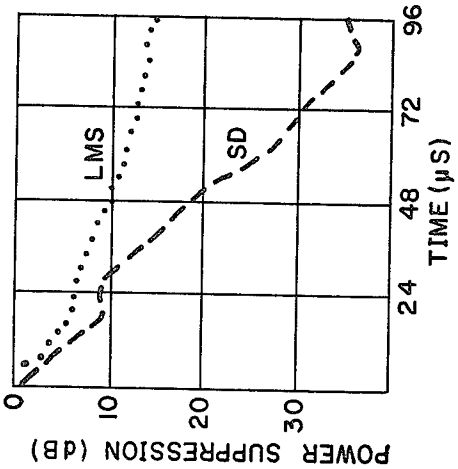

STEEPEST DESCENT CONTROLLER FOR AN ADAPTIVE ANTENNA ARRAY

BACKGROUND OF THE INVENTION

An antenna links a receiver to its electromagnetic environment. A desired signal incident upon the antenna is processed by the receiver, thereby extracting from it certain information. However, in the presence of sufficiently strong incidental or intentional interference, the desired signal becomes so overwhelmed, that the receiver can no longer properly perform its function. This undesirable situation may be alleviated to a large extent with the use of adaptive array processing.

In adaptive array processing the desired signal is enhanced over an interference by introducing an auxiliary antenna which, upon appropriately weighting (with amplitude and phase) the signal therefrom, will combine with the main antenna signal to form a null in the direction of the interference. This nulling operation is generally done automatically with the use of a feedback controller. An appropriate function of the feedback controller is the minimization of average combined power with respect to the auxiliary weight. In fact, since the nulled auxiliary antenna observes substantially sidelobe power, its influence is confined essentially to the sidelobe power, having minimal effect on the main beam and, thereby, leaving the desired signal practically unperturbed.

Conventional gradient control is described in detail in an article by B. Widrow, et al, "Adaptive Antenna Systems", procedures of the IEEE, Volume 55, Number 12, December 1967. Conventional gradient control is suboptimal in the sense that it incorporates a constant gain instead of optimal gain and as a consequence can guarantee stability only with a sufficiently small gain to the expense of relatively slow convergence. Generally, constant gain gradient control cannot account for the underlying geometry of the power hyperparaboloid.

SUMMARY OF THE INVENTION

The present invention pertains to an adaptive antenna array including a main antenna and at least one auxiliary antenna, said array having in combination therewith, a controller for producing substantially stable convergence of weights comprising the weight vector W(t) to reduce side lobe interference including a summing circuit receiving signals from the main antenna and weighted signals from the auxiliary antenna and data processing means connected to receive an output signal from the summing circuit and signals from the auxiliary antenna, said data processing means including variable weighting means coupling the output signal of the auxiliary antenna to the summing circuit and further means for adjusting said variable weighting means in accordance with the following equation $$w = -\frac{1}{T} \int_{-\infty}^{t} \lambda(\tau)\gamma(\tau)\,d\tau$$

where:

w is the weighting adjustment,

T is a predetermined time period, $$\lambda = \frac{\langle \gamma^T s, s_c \rangle}{\| \gamma^T s \|^2},$$

$\gamma = \langle s, s_C \rangle$, s is the auxiliary antenna signal, and $s_c$ is the sum of the main antenna signal and the weighted auxiliary antenna signal.

It is an object of the present invention to provide a new and improved controller for producing substantially stable convergence of weights comprising the weight vector w(t) in an adaptive antenna array.

It is a further object of the present invention to provide a method of substantially stable convergence of weights comprising the weight vector w(t) in an adaptive antenna array.

It is a further object of the present invention to incorporate the steepest descent algorithm in apparatus and a method for deriving the optimal feedback gain in an adaptive antenna array to guarantee substantially stable and relatively rapid convergence of the weights comprising the weight vector w(t) to reduce sidelobe interference.

These and other objects of this invention will be apparent to those skilled in the art upon consideration of the accompanying specification, claims and drawings.

BRIEF DESCRIPTION OF THE DRAWINGS

Referring to the drawings:

FIG. 1 is a block diagram of an adaptive array including a data processor;

FIG. 2 is a contour map representing a real non-negative scalar quadratic function of the complex N-vector w(t);

FIG. 3 is a performance comparison of LMS (Widrow's paper) and SD algorithms for adaptive antenna arrays.

DESCRIPTION OF THE PREFERRED EMBODIMENT

Figure 4:
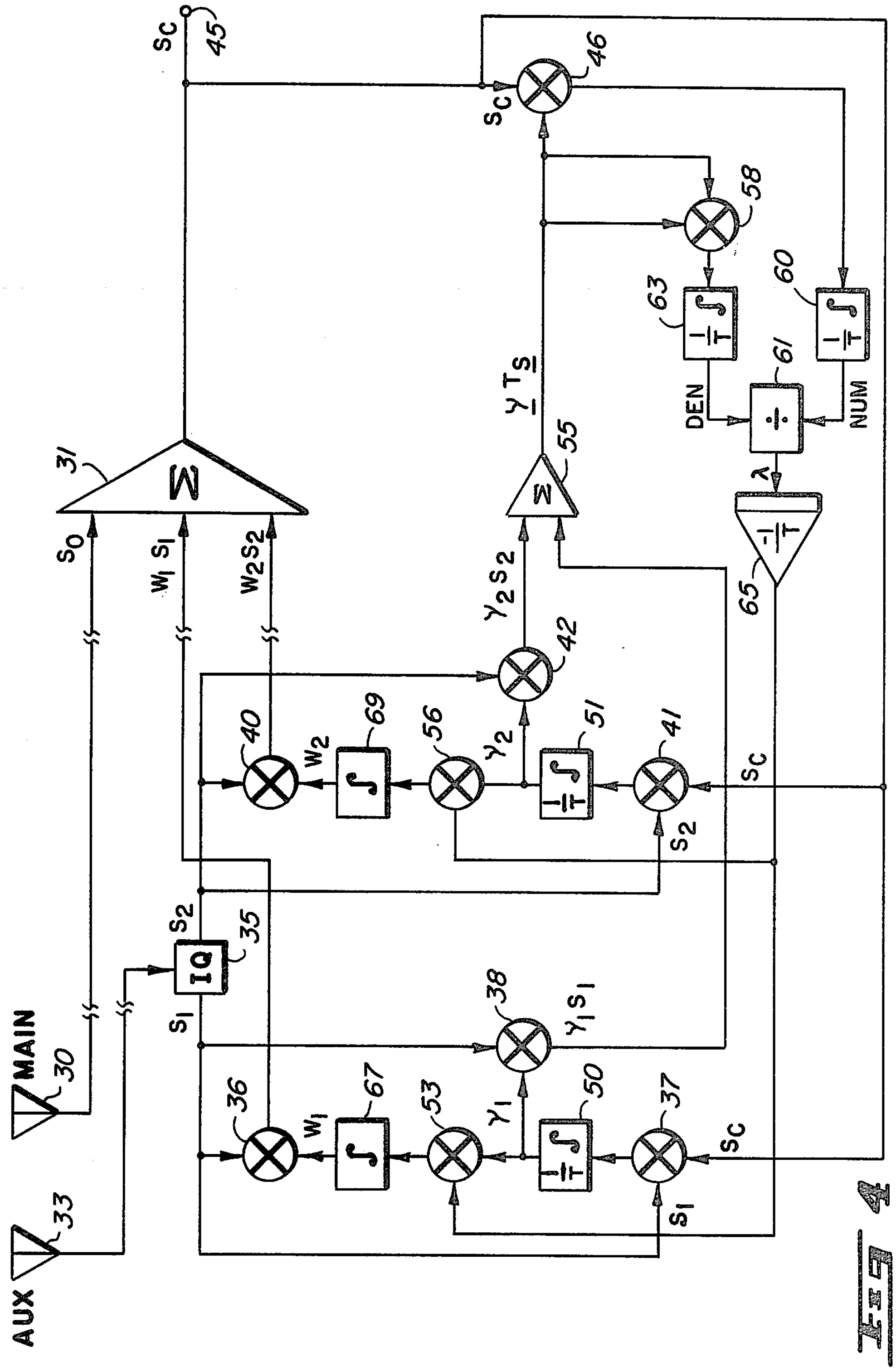
FIG. 4 is a block diagram of an adaptive antenna array including a controller embodying the present invention.

Referring specifically to FIG. 1, a main directional antenna 10 is connected to an input of a summing device 11 through a receiver 12. An auxiliary antenna 15, which is generally omnidirectional, is connected through a weighting device 16 and a receiver 17 to a second input of the summing device 11. The receivers 12 and 17 represent circuitry for amplifying signals from the antennas and for converting the signals to an intermediate frequency if desired. In general, the receivers 12 and 17 might be located at a variety of positions in the system and, since they do not form a portion of the present invention, they will not be discussed in detail and it will be assumed throughout this disclosure that they are included as a portion of other components of the system. The output of the summing device 11 is fed back to a steepest descent data processor 20, which also receives an input from the auxiliary antenna 15 and supplies a control signal, or weight vector, to the weighting device 16.

An antenna pattern is illustrated in conjunction with the main antenna 10 and auxiliary antenna 15 to aid in illustrating the operation thereof. The solid line drawing illustrates the pattern of the main antenna 10 with a main lobe 21 directed toward a desired signal (represented by arrow 22). An interference signal (represented by arrow 25) is directed along a sidelobe of the main antenna 10. A dashed line 26 represents a pattern of the auxiliary antenna 15 and is generally omnidirectional except for a null directed along the main lobe 21 of the main antenna 10. By appropriately weighting (adjusting amplitude and phase) the auxiliary antenna output, the pattern 26 is approximately equal in amplitude to the sidelobes and opposite in phase so that the interference signals in the sidelobes are cancelled in the summing device 11 and the null in the direction of the main lobe 21 is produced. By utilizing the steepest descent processor 20, rapid and substantially stable convergence of weights comprising a weight vector w(t) is produced to reduce the sidelobe interference and produce the mainlobe null. This particular example of adaptive array processing, put in a more general setting, will serve to develop and make precise the underlying optimal steepest descent control.

Consider the general case of the above example involving M distinct directional sidelobe interferences. In principle, these interferences may be nulled by using at least as many auxiliaries in a weighted combination with the main antenna. Let the number of auxiliaries be N, N>M, and assign to them complex weights $w_i$, i=1, . . . , N, each representing the in-phase and quadrature components as real and imaginary parts, respectively. Consequently, the i-th weighted auxiliary signals is of the form $w_i s_i(t)$, itself a complex signal, and the combined signal is given by $$s_c(t)=w^T s(t)+s_o(t) \tag{1}$$

where $s_c(t)$=the combined complex scalar signal $s_o(t)$=the main antenna complex scalar signal s(t)=the auxiliary complex signal N-vector, each component of which represents the signal at the corresponding auxiliary antenna w=the auxiliary complex weight N-vector It is the purpose of the adaptive array process to arrive at a weight vector $w^O$ that is optimal in the sense that it minimizes a convenient metric such as the average combined power over a sufficiently large time period T, namely $$P(w(t),t)=\frac{1}{T}\int_{t-T}^{t}|s_c(\tau)|^2 d\tau = \frac{1}{T}\int_{t-T}^{t}|w^T(\tau)s(\tau)+s_o(\tau)|^2 d\tau \tag{2}$$

which is a real non-negative scalar quadratic function of the complex N-vector w(t) representing a hyperparaboloidal surface in (2 N+1)-space having at least one minimum.

Given the current value of w(t), it is desirable to evolve w(t) along a direction that will tend to diminish $P_c(w(t),t)$. Calculus dictates that such a direction is along the negative gradient vector of $P_c(w(t),t)$ with respect to w(t), the direction along which $P_c(w(t),t)$ decreases in value at the fastest rate. To derive the complex gradient N-vector, expand (2) in terms of real and imaginary parts using compact Hilbert space notation.

According to compact Hilbert space notation, given complex time-domain functions x(t) and y(t), define their inner product at time t by $$<x,y>=\frac{1}{T}\int_{t-T}^{t}x^*(\tau)\,y(\tau)\,d\tau$$

and denote the self inner product by metric notation, namely, $<x,x>=||x||^2$.

In fact, (2) may be rewritten as $$\begin{aligned} P_c(w(t),t) &= <s_c, s_c> \\ &= ||s_c||^2 \\ &= ||s_{CR}||^2+||s_{CI}||^2 \\ &= ||w_R^1 s_R - w_I^1 s_I + s_{OR}||^2 + ||w_R^1 s_I + w_I^1 s_R + s_{OI}||^2 \\ &= P_c(w_R(t), w_I(t),t) \end{aligned} \tag{3}$$

which may be viewed as a function of two real N-vectors, namely, $w_R$ and $w_I$. The complex gradient of $P_c(w(t),t)$ may be defined with respect to w(t) by $$\gamma(t)=\tfrac{1}{2}(\nabla w_R(t)+j\nabla w_I(t))P_c(w_R(t),w_I(t),t) \tag{4}$$

which, specifically, works out to be $$\begin{aligned} \gamma(t) &= (<s_R,s_{CR}>+<s_I,s_{CI}>)-j(<s_I,s_{CR}>-<s_R,s_{CI}>) \\ &= <s, s_c> \\ &= \frac{1}{T}\int_{t-T}^{t}s^*(\tau)\,s_c(\tau)\,d\tau \end{aligned} \tag{5}$$

Within the infinitesimal interval of time Δt, the weight vector w(t) will be updated by an infinitesimal amount Δw(t) taken along the negative gradient direction from w(t); i.e., $$w(t+\Delta t)=w(t)+\Delta w(t) \tag{6}$$

where $\Delta w(t)=-\lambda(t)\gamma(t)^0(\Delta t)$, $\lambda(t)$ is a positive real gain function and $^0(\Delta t)$ is a term of order Δt, to be determined. The derivation of λ(t) is best understood by appealing to the geometrical interpretation of the problem at hand. FIG. 2 shows a contour map of $P_c(w(t),t)$ for the special case of N=M−1.

Suppose that a given time $t_O$ the value of the weight and gradient vectors are $w^0$ and $\gamma^0$, respectively. With this information at hand consider the variation of $P_c$ along the negative gradient cord $$w^{01}(\gamma)=w^0-\lambda\gamma^0 \tag{7}$$

where $\lambda \geqq 0$. Since $w^0$ and $\gamma^0$ are fixed, $P_c$ may be considered to be a function of the scalar variable λ. As λ increases from zero, $P_c$ decreases until it reaches a minimum value at $\lambda=\lambda_0$ where the cord happens to be tangent to contour $P_1$. This point of tangency constitutes an improved estimate of w over the previous value of $w^0$. Specifically, the new estimate is given by $$w^1=w^0-\lambda_0\gamma^0 \tag{8}$$

which readily suggests the iterative process for evolving the optimal weight vector as shown in FIG. 2. Note that the one-step instantaneous weight update given in (8) utilizes all useful information in $\gamma^0$ by optimally relaxing $P_c$ along $-\gamma^0$ as described above. As such, this process must necessarily dwell at each updated weight a period of time T needed to generate a new smooth estimate of gradient there using (5). In terms of implementation this "integrate-and-dump" process is most suitable to a digital realization although not entirely objectionable to an analog one.

From the preceding discussion, it is clear that we seek a $\lambda_0$ that minimizes $P_c(w^{01}(\lambda))$, thus satisfying the relation $$\frac{d}{d\lambda} P_c(w^{01}(\lambda)) = \frac{d}{d\lambda} \|(w^0 - \lambda\gamma^0)^T s + s_0\|^2 = 0 \tag{9}$$

whence it can be shown that $$\lambda_o = \frac{Re<\gamma^{oT}s, s_c>}{|\gamma^{oT}s|^2} \tag{10}$$

$$= \frac{\frac{1}{T}\int_{t_o-T}^{t_o} Re[\gamma^{*1}(t_o)s^*(\tau)s_c(\tau)]d\tau}{\frac{1}{T}\int_{t_o-T}^{t_o} |\gamma^1(t_o)s(\tau)|^2 d\tau}$$

where $$\gamma^0 = \gamma(t_o) = \frac{1}{T}\int_{t_o-t}^{t_o} s^*(\tau)s_c(\tau)d\tau$$

The discrete-step iterative procedure described above is the steepest-descent (SD) method.

With the insight from the above discussion, it is now possible to make precise the equivalent incremental weight updating given in (6). At time t, the gradient vector is given by $$\gamma(t) = \frac{1}{T}\int_{t-T}^{t} s^*(\tau)s_c(\tau)d\tau \tag{11}$$

and the full gain by $$\lambda(t) = \frac{\frac{1}{T}\int_{t-T}^{t} Re[\gamma^{*T}(t)s^*(\tau)s_c(\tau)]\,d\tau}{\frac{1}{T}\int_{t-T}^{t} |\gamma^T(t)s(\tau)|^2\,d\tau} \tag{12}$$

Within an infinitesimal interval $\Delta t$ from t, $\gamma(t)$ will stay substantially at the same value except for a fractional part of $\Delta t/T$.

This dictates that (6) be written more precisely as $$w(t+\Delta t) = (w(t) - \frac{1}{T}\lambda(t)\gamma(t)\Delta t \tag{13}$$

Whence, upon taking the limit as $\Delta t \rightarrow 0$, the first order differential equation becomes $$\dot{w}(t) = -\frac{1}{T}\lambda(t)\gamma(t) \tag{14}$$

from which it can be concluded that the weight vector at any time t is given by $$w(t) = -\frac{1}{T}\int_{-\infty}^{t} \lambda(\tau)\gamma(\tau)d\tau \tag{15}$$

It is important to note here that although expression (12) may be computed correctly in a digital system, the same is not true in an analog implementation without functional duplication. However, considering that $\gamma(t)$ represents correlation statistics for the preceding interval of time T, it makes sense to augment expression (12) into a form more suitable for analog processing, namely, $$\lambda(t) = \frac{\frac{1}{T}\int_{t-T}^{t} Re[\gamma^{*T}(\tau)s^*(\tau-T)s_c(\tau-T)]\,d\tau}{\frac{1}{T}\int_{t-T}^{t} |\gamma^T(\tau)s(\tau-T)|^2\,d\tau} \tag{16}$$

involving the current gradient $\gamma(t)$ and delayed signals $s(t-T)$ and $s_c(t-T)$. Further, if s(t) and $s_0(t)$ are stationary processes, these delays may be ignored, giving rise to the simpler expression $$\lambda(t) = \frac{\frac{1}{T}\int_{t-T}^{t} Re[\gamma^{*1}(\tau)s^*(\tau)s_c(\tau)]\,d\tau}{\frac{1}{T}\int_{t-T}^{t} |\gamma^1(\tau)s(\tau)|^2\,d\tau} \tag{17}$$

Of course, $\lambda(t)$ as obtained from (16) is more appropriate when s(t) and $s_0(t)$ are nonstationary processes.

The complex SD-controlled adaptive array process described above is in the form needed for baseband operation which is most easily accomplished by digital means. For practical reasons, an analog realization of this process must be carried out at some convenient intermediate frequency (IF) where the bandwidth of the desired signal constitutes a small percentage ($\leqq 10\%$) of the IF center frequency. At IF all signals may be considered to be real-valued. Upon translation to baseband, however, both in-phase and quadrature parts are needed to represent fully the information contained in the original signal. With this in mind, an analog implementation would be simpler than that implied by relations (11), (15) and (17). In fact, since in the latter case $s_0(t)$ and $s_c(t)$ are real, the combined average power to be minimized is given by $$\begin{aligned} P_c(w(t), t) &= \|s_c\|^2 \\ &= \|Re[W^Ts] + s_0\|^2 \\ &= \|w_R{}^T s_R - w_I{}^T s_I + s_0\|^2 \end{aligned}$$

which, upon defining the real-valued concatenations $$w = \begin{bmatrix} w_R \\ -w_I \end{bmatrix}, \quad s = \begin{bmatrix} s_R \\ s_I \end{bmatrix} \tag{18}$$

results in the simpler expression $$P_c(w(t),t) = |51\; w^T s + s_0|^2 \tag{19}$$

where w and s now are real 2 N-vectors defined by (18). Specialized to the analog case the pertinent relations (11), (17) and (15) become, respectively, $$\gamma = \langle s, s_c \rangle \qquad (20)$$

$$\lambda = \frac{\langle \gamma^T s, s_c \rangle}{\|\gamma^T s\|^2}$$

$$w = -\frac{1}{T} \int_{-\infty}^{t} \lambda(\tau)\gamma(\tau)d\tau$$

FIG. 4 illustrates a more detailed block diagram of an implementation of the system illustrated generally in FIG. 1. The block diagram of FIG. 4 implements the relations (20) in an analog system, but it should be understood that any of the components or groups of components might be constructed to operate digitally or the entire system might be operated digitally by simply utilizing the above mathematical formulations. Further, while the weighting device 16 and summing device 11 are illustrated as components separate from the data processor 20 (in FIG. 1) it should be understood that these components can be considered a portion of the data processor 20 and are illustrated separately simply to show the feedback paths. FIG. 4 illustrates the special case where N=1, or a single interference (as illustrated in FIG. 1) can be nulled.

A main antenna 30 is coupled to one input of a summing device 31. An auxiliary antenna 33 is connected to an input of a phase splitting device 35 which provides in-phase and quadrature components of the input signal at 2 outputs thereof, respectively. The in-phase component of the signal is applied to inputs of multipliers 36, 37 and 38. The quadrature component of the signal is applied to inputs of multipliers 40, 41 and 42. The multipliers 36 and 40 operate as variable weighting circuits and multiply the components of the auxiliary antenna signal by weight vectors. The outputs of the multipliers 36 and 40 are applied to two inputs of the summing circuit 31. The output of the summing circuit 31 is applied to an output terminal 45 which operates as an output for the system and is also applied to an input of a multiplier 46 as well as inputs of the multipliers 37 and 41. The multipliers 37 and 41 multiply in-phase and quadrature components of the auxiliary antenna signal by the composite output signal of the summing circuit 31. The outputs of the multipliers 37 and 41 are each applied through circuits 50 and 51, respectively, which integrate the signals and multiply by a factor 1/T, to provide output signals representative of the in-phase and quadrature gradient vectors. The circuits 50 and 51 may be mechanized, for example, by means of an RC filter with bandwidth of 1/T. Also, while an analog embodiment is illustrated, the filters could be digital or a moving window average.

The in-phase gradient vector signal is applied to one input of the multiplier 38 and to an input of another multiplier 53. The output of the multiplier 38 is applied to one input of a summing device 55. The quadrature gradient vector signal is applied to an input of the multiplier 42 and to an input of another multiplier 56. The output of the multiplier 42 is applied to a second input of the summing device 55. The output of the summing device 55 is connected to an input of the multiplier 46 and to both inputs of a multiplier 58, so that the output thereof is the square of the input. The output of the multiplier 46 is applied through a circuit 60 which integrates the signal and multiplies by a factor 1/T. The output of the circuit 60 is applied to a dividing circuit 61 as the numerator. The output of the multiplier 58 is applied through a circuit 63, similar to circuit 60, the output of which is applied to the dividing circuit 61 as the denominator. The output of the dividing circuit 61 is the optimal gain of the system.

The optimal gain signal from the dividing circuit 61 is applied through an amplifying circuit 65, which applies a multiplication factor of −1/T, to inputs of the multipliers 53 and 56. The output of the multiplier 53 is integrated in a circuit 67 and applied as the in-phase weighting vector to the multiplier 36. The output of the multipler 56 is integrated in a circuit 69 and applied as the quadrature weighting vector to the multiplier 40. The multiplers 36 and 40 multiply the in-phase and quadrature components of the auxiliary antenna signal by the in-phase and quadrature weighting vectors to produce the desired nulling of the interference signal. While the present embodiment illustrates an IF analog implementation it should be understood that an off-baseband digital embodiment would be substantially the same. However, a digital baseband implementation must employ full complex arithmetic according to the above described controlling equations. A hybrid implementation could be devised wherein the processor is implemented in IF up until the mixer, 37 and 41, outputs and becomes digital prior to the circuits 50 and 51. The processor could then remain digital throughout the weight generation process. The weight may then be converted to analog and applied as usual. Many other hybrid digital/analog embodiments may be devised by those skilled in the art. While specific components have been illustrated and specific titles have been utilized to indicate the operation of these components, it will be understood by those skilled in the art that these terms and components indicate generally the desired result and any circuit or component which can perform the desired result may be utilized therein.

To further illustrate the advantage of the present adaptive antenna array with steepest descent data processor over the prior art LMS apparatus, a comparison of the convergence rate in terms of instantaneous interference suppression versus time is illustrated in FIG. 3. Thus, an improved controller for an adaptive antenna array is disclosed which has the advantage, relative to the prior art, of producing rapid and substantially stable convergence of weights comprising the weight vector w(t) to reduce sidelobe interference. Further, as illustrated and described, the present system can be implemented in either analog or digital form. Also, the method of rapid and substantially stable convergence of weights comprising the weight vector w(t) to reduce sidelobe interference is described. While I have shown and described specific embodiments of this invention, further modifications and improvements will occur to those skilled in the art. I desire it to be understood, therefore, that this invention is not limited to the particular form shown and I intend in the appended claims to cover all modifications which do not depart from the spirit and scope of this invention.

I claim:

1. In combination with an adaptive antenna array, a controller for producing substantially stable convergence of weights to reduce sidelobe interference comprising:

(a) a summing circuit providing an output signal which is the mathematical sum of input signals applied thereto;

(b) a main antenna connected to supply an input signal to said summing circuit;

(c) auxiliary antenna means providing at least one output signal; and (d) data processing means connected to receive the output signal of said summing circuit and the signal from the auxiliary antenna means for processing the signals according to a steepest descent algorithm to supply output signals to inputs of said summing circuit having optimal feedback gain to substantially reduce sidelobe interference.

2. A controller as claimed in claim 1 including quadrature means connected to receive the output signal from the auxiliary antenna means and supply in-phase and quadrature components thereof to the summing circuit and the data processing means.

3. A controller as claimed in claim 1 wherein at least a portion of the data processing means is analog circuitry.

4. A controller as claimed in claim 1 wherein at least a portion of the data processing means is digital circuitry.

5. A controller as claimed in claim 1 wherein the data processing means includes variable weighting circuits coupling the output signal of the auxiliary antenna to the summing circuit, circuit means for providing signals representative of a gradient vector and optimal gain and circuit means utilizing the gradient vector signal and the optimal gain signal for providing a signal representative of the weight vector and utilizing the weight vector signal for supplying an adjusting signal to said variable weighting circuits.

6. A controller as claimed in claim 5 including quadrature means connected to receive the output signal from the auxiliary antenna means and supply in-phase and quadrature components thereof to the summing circuit and the data processing means.

7. A controller as claimed in claim 6 wherein the circuit means for providing signals representative of a gradient vector include multiplying and integrating means connected to receive the output signal of the summing circuit and the in-phase and quadrature components of the auxiliary antenna output signal and to multiply each of the components with the output signal and provide integrated output signals, multiplying means connected to receive the integrated output signals and the in-phase and quadrature components and to multiply each of the components by the respective integrated output signal, and summing means connected to receive the products from the multiplying means and to provide an output signal representative of the gradient vector.

8. A controller as claimed in claim 7 wherein the circuit means for providing signals representative of optimal gain include first multiplying and integrating means connected to receive the output signal representative of the gradient vector and the output signal of the summing circuit and to provide a first output signal which is the product of the two signals integrated over a predetermined period of time, second multiplying and integrating means connected to receive the output signal representative of the gradient vector and to provide a second output signal which is the product of the gradient vector signal multiplied by itself and integrated over the predetermined period of time, and dividing means connected to receive the first and second output signals and to divide the first output signal by the second output signal to provide a signal representative of the optimal gain.

9. A controller as claimed in claim 8 wherein the circuit means utilizing the gradient vector signal and the optimal gain signal for providing a signal representative of the weight vector includes first multiplying means connected to receive the signal representative of the optimal gain and to provide an output signal representative of the optimal gain signal multiplied by a factor representative of the inverse of the predetermined period of time, second and third multiplying and integrating means connected to the multiplying and integrating means of the gradient vector circuit means for receiving signals representative of the in-phase and quadrature integrated output signals respectively, and each of said second and third multiplying means being further connected to receive the output signal of said first multiplying means and to provide output signals representative of the in-phase and quadrature weight vectors.

10. In combination with an adaptive antenna array, a controller for producing substantially stable convergence of weights to reduce sidelobe interference comprising:

(a) a summing circuit providing an output signal, $s_c$ which is the mathematical sum of input signals applied thereto;

(b) a main antenna connected to supply an input signal to said summing circuit;

(c) auxiliary antenna means providing at least one input signal, s; and (d) data processing means connected to receive the output signal of said summing circuit and the signal from the auxiliary antenna means and including variable weighting means coupling the output signal of the auxiliary antenna to the summing circuit and further means for adjusting said variable weighting means in accordance with the following equation $$w(t) = -\frac{1}{T} \int_{-\infty}^{t} \lambda(\tau)\gamma(\tau)\, d\tau$$

where, w(t) is the weighting adjustment, T is a predetermined time period, with $$\lambda = \frac{\langle \gamma^T s, s_c \rangle}{\|\gamma^T s\|^2}$$

$$\gamma = \langle s, s_c \rangle$$

11. In conjunction with an adaptive antenna array including a main antenna and at least one auxiliary antenna a method of weighting signals from the antennas producing substantially stable convergence of the weights to reduce sidelobe interference comprising the steps of:

(a) weighting signals from the auxiliary antenna;

(b) summing the weighted auxiliary antenna signals with signals from the main antenna; and (c) utilizing the summed signals and unweighted signals from the auxiliary antenna to adjust the weighting of the signals from the auxiliary antenna in accordance with a steepest descent algorithm to produce substantially stable convergence of the weights of nullify side-lobe interference.

12. In conjunction with an adaptive antenna array including a main antenna and at least one auxiliary antenna a method of weighting signals from the antennas producing substantially stable convergence of the weights to reduce sidelobe interference comprising the steps of:

(a) weighting signals, s, from the auxiliary antenna;

(b) summing the weighted auxiliary antenna signals with signals, $s_c$, from the main antenna; and (c) adjusting the weighting of the signals from the auxiliary antenna in accordance with the following equation $$w(t) = -\frac{1}{T} \int_{-\infty}^{t} \lambda(\tau)\gamma(\tau)\, d\tau$$

where: w(t) is the weighting adjustment, T is a predetermined time period, and $$\lambda = \frac{\langle \gamma^T s, s_c \rangle}{\|\gamma^T s\|^2}$$

$$\gamma = \langle s, s_c \rangle$$

* * * * *